United States Patent [15] 3,668,167
Ragazzini et al. [45] June 6, 1972

[54] PROCESS FOR CONCENTRATING AQUEOUS EMULSIONS OF FLUORINATED POLYMERS

[72] Inventors: Mario Ragazzini, Milan; Alberto Caimi, Legnano; Donato Carcano; Giovanni Groppelli, both of Milan, all of Italy

[73] Assignee: Montecatini Edison S.p.A., Milan, Italy

[22] Filed: Dec. 1, 1969

[21] Appl. No.: 881,339

Related U.S. Application Data

[63] Continuation-in-part of Ser. No. 635,400, May 2, 1967, abandoned.

[30] Foreign Application Priority Data

May 4, 1966 Italy.....................................17486/66

[52] U.S. Cl...................260/29.6 F, 260/17 R, 260/17.4 SG, 260/29.6 ME, 260/29.6 MN, 260/29.6 PT
[51] Int. Cl.........................................................C08f 45/24
[58] Field of Search..................260/29.6 F, 29.6 PT, 92.1 R, 260/17 R, 17.4 R

[56] References Cited

UNITED STATES PATENTS 2,878,196  3/1959  Buffington......................260/29.6 PT
3,118,846  1/1964  Boyer..................................260/17 R
3,301,807  1/1967  Hoashi..................................260/29.6

FOREIGN PATENTS OR APPLICATIONS 536,455  1/1957  Canada

*Primary Examiner*—Harold D. Anderson
*Attorney*—Stevens, Davis, Miller & Mosher

[57] ABSTRACT

A process for the concentration of aqueous polytetrafluoroethylene emulsions comprising forming atop the emulsion to be concentrated a layer of water absorbing agent, maintaining the resultant two layers in contact with each other until absorption of water from the emulsion by the said water absorbing agent has proceeded to a desired degree, separating the said layers, and thence recovering the aqueous polytetrafluoroethylene emulsion thus concentrated. The water absorbing agent can be any one of a number of water soluble organic liquid or solid water absorbing agents having a density less than that of the emulsions to be concentrated.

1 Claim, No Drawings

PROCESS FOR CONCENTRATING AQUEOUS EMULSIONS OF FLUORINATED POLYMERS

This application is a continuation-in-part of our prior application Ser. No. 635,400, filed May 2, 1967, now abandoned.

BACKGROUND OF THE INVENTION

The present invention relates to a process for concentrating aqueous emulsions of polytetrafluoroethylene and, more particularly, it relates to a process for conducting an inexpensive and rapid concentration of aqueous emulsions of polytetrafluoroethylene without the formation of any sort of coagulum.

The usefulness of aqueous polytetrafluoroethylene emulsions is well known; said emulsions constitute, as a matter of fact, the raw material for obtaining varnishes, pastes for lubricated extrusion, films, metal coatings, coatings on ceramics, for the impregnation of fibers, etc.

The aqueous polytetrafluoroethylene emulsions which have proved commercially interesting, have in general, a content in solid polymer around 60 percent, while by usual polymerization methods it is possible normally only to obtain emulsions with a content in solid polymer of about 30 percent by weight. It is thus necessary to carry out a concentration of the aqueous emulsions obtained by standard polymerization methods, in order to increase their content in solid polymer.

The concentration of said emulsions may be carried out by several methods known to one of ordinary skill in the art.

It is known to carry out the concentration of aqueous polytetrafluoroethylene emulsions having a content in solid polymer of from 2–8 percent by weight, through stabilizing the emulsion by means of a non-ionic or anionic surface active agent and by successively precipitating the solid polymer in a reversible way. The excess liquid is removed and, at this point, the flocculated particles may be emulsified again by peptizing the dispersing agent which had become inactive.

It is also known to carry out the concentration of aqueous polytetrafluoroethylene emulsions by dissolving in said emulsions non-ionic dispersing agents which exhibit the phenomenon of solubility inversion above a certain temperature, such as the products of the polyoxyethylation of alkylphenols, by adding small quantities of electrolytes and by heating at 50°–80°C (Canadian Pat. No. 536,455).

Without adding electrolytes or heating, it is impossible to obtain the concentration, owing to the fact that the emulsion is too stable, and the decantation of product of high concentration does not take place. That appears from the examples nos. 30 and 31.

Furthermore, it is also known to carry out the concentration by using solid water-insoluble substances such as silica gel or ion-exchange resins which, in anhydrous state, have the capacity to absorb water.

It is also known to carry out the concentration of emulsions by vaporization under reduced pressure of the water contained in the emulsion, after previous stabilization of the emulsion, while being careful to avoid any overheating and the formation of foams.

All of the above known methods have, however, various drawbacks. Some of them are not applicable to emulsions having a content in solid polymer of 30 percent by weight, such as are normally obtained in conventional polymerizing processes, inasmuch as they cause an irreversible coagulation of the emulsion.

In other processes there may only be used surfactants which exhibit the phenomenon of solubility inversion within certain definite temperature ranges. Furthermore, said surfactants must be added to the emulsion in the form of 30–40 percent aqueous emulsions, in order to avoid the formation of large clots during the mixing phase, which is necessary in these processes. This involves a further dilution of the starting emulsion, as well as a greater waste of time.

Further drawbacks are represented by the difficulty in effecting a strictly homogeneous heating of the entire emulsion to avoid local overheatings that may cause the formation of irreversible clots within the emulsion.

Another drawback that occurs in the processes in which the addition of electrolytes is necessary, is represented by the fact that the quantity of electrolyte to be added is extremely critical. In these processes, the temperature at which the concentration is carried out may vary only within a very narrow temperature range; this carries with it a further disadvantage, which is that of having to maintain the temperature constant within this narrow range.

Some of the processes are not applicable to those emulsions that have a content in solid polymer lower than 30 percent by weight or higher than 50 percent by weight. Still further drawbacks, characteristics of such processes in which solid, water insoluble dehydrating substances are used, are represented by the fact that considerable quantities of dehydrating agent are required with respect to the quantity of emulsion to be concentrated, and by the fact that the dehydrating agent may very easily behave as a coagulating center, by covering itself with polymer and, consequently, by losing its dehydrating action. For this reason the recovery of the dehydrating agent will turn out to be extremely difficult.

Still other drawbacks, characteristics of processes for the concentration of emulsions by distillation at reduced pressure, of water, are represented, for instance, by the case with which a mass-coagulation of the entire emulsion may set in, as well as by the high cost of the operations, that require the prolonged heating of great quantities of emulsion.

Therefore an object of the present invention is that of providing a new process for the concentration of aqueous polytetrafluoroethylene emulsions, which is free from the disadvantages of the known processes.

A further object of this invention is that of providing a process for the concentration of said emulsions, which process avoids the formation of coagulum during the concentration stage.

These and still other objects are achieved through the present invention, which offers, furthermore, considerable advantages.

One advantage of this invention is represented by the low cost of the process, which is carried out at a temperature around room temperature and within a relatively short time interval. Another advantage of this invention is represented by the fact that, it is not necessary to heat the emulsion, which fact permits one to avoid the danger of local overheatings, which are quite frequent, particularly when great quantities of emulsion are handled.

Another advantage is represented by the fact that the dehydrating agent according to this invention may be re-used without losses occuring; which fact contributes to the economy of the process.

Still another advantage resides in the fact that the process according to this invention is carried out quite readily, inasmuch as it does not require the use of special equipment or the adoption of particular technical manipulations.

A further advantage of the process according to this invention is in the high purity of the emulsions that are obtained thereby; as a matter of fact, according to the invention, the concentration is carried out without emulsification with foreign substances.

Still a further advantage is affected by the versatility of the process in comparison to the variety of dehydrating substances that can be used.

There is also evidenced the advantage that, by operating according to this invention, it is possible to obtain emulsions that have a particularly high content in solid polymer, starting from emulsions having any concentration whatsoever in solid polymer.

THE INVENTION

The process of this invention comprises stratifying atop an aqueous polytetrafluoroethylene emulsion, having a relatively low content in solid polymer, an organic water absorbing substance, soluble in water, and having a density lower than that of the aqueous emulsions and higher than 1, and viscosity higher than 200 cps, then keeping the two layers in contact with each other until the absorption of water by the organic substance has proceeded to a desired degree, and thence separating the two layers and recovering the aqueous polytetrafluoroethylene emulsion.

The aqueous polytetrafluoroethylene emulsion which is thus obtained will show a content in solid polymer considerably higher than that is the starting emulsions.

The contact time between the two liquid layers necessary to obtain the concentration of the emulsion does not exceed 5 hours.

According to a preferred form of embodiment of the present invention, one operates in the following way:

Into a reactor provided at its bottom with a discharge device, an aqueous polytetrafluoroethylene emulsion is introduced having a solid content comprised from between about 5 and 50 percent by weight.

Onto or atop this emulsion there is slowly placed a layer of organic water absorbing substance having a density lower than that of the emulsion to be concentrated but higher than 1 and having viscosity higher than 200 cps and which substance is soluble in water. In this manner two layers are formed: the lower layer having a high content in water and the upper layer predominantly water absorbing substance.

It has been found that through the separation surface, there occurs a diffusion of the water of the lower layer, into the upper layer.

In this way, the polytetrafluoroethylene emulsion gradually loses part of the water it contains, thus concentrating itself to the extent of reaching a content in solid polymer even greater than 70 percent.

With the gradual absorption of the water by the organic substance the density of the emulsion rises to values even higher than 1.60 g./cm.$^3$, while the density of the upper overlaying liquid, owing to dilution, tends to reach the density of the water. The separation surface between the two layers remains clear-cut, though the viscosity of the dehydrating liquid diminishes. Within just a few hours this separation surface drops to stabilize itself at certain level. The concentrated emulsion is then quantitatively removed through the discharge device located at the bottom of the concentration vessel without being contaminated by the dehydrating product.

The water absorbing substances used in the process according to the invention are water soluble organic substances having in working conditions a density lower than that of the polytetrafluoroethylene emulsion to be concentrated, but higher than 1 and viscosity higher than 200 cps.

As water absorbing substances there may be used polyalcohols such as glycerine, polyethers such as polyethyleneglycols and polypropyleneglycols, polysaccharides such as methylcellulose, reaction products of ethylene oxide and/or propylene oxide with alcohols, acids, amines, substituted phenols, hexitanes, hexides and the like.

Such substances may either be liquid or solid.

In the case water absorbing substance is solid or waxlike, a concentrated aqueous solution may be prepared thereof and then it may be stratified onto the emulsion to be concentrated. Alternatively, the solid or waxlike water absorbing substances may be melted through heating and then poured in molten state onto the polytetrafluoroethylene emulsion to be concentrated, so that it will stratify on its surface. The quantity of water absorbing substance necessary depends mainly on the concentration of the starting emulsion and on the concentration of the emulsion that is desired. Particular advantages have been attained by using the reaction products of ethylene oxide and/or propylene oxide; the best known of which exhibit the following general formulas:

a.: $H(OC_2H_4)_a(OC_3H_6)_b(OC_2H_4)_cOH$ wherein $b$ varies preferably from 10 to 100 and the sum $a+c$ from 10 to 400.

Some of the products that have this general formula are marketed by the Wyandotte Chem. Corp. under the name of "Pluronic."

b. $[H(OC_2H_4)_a(OC_3H_6)_b]_2 = N-CH_2-CH_2-N$
$= [(C_3H_6O)_b (C_2H_4O)_a H]_2$ wherein $a$ varies preferably from 1 to 100 and $b$ from 1 to 25.

Some of the products of this type are marketed by Wyandotte Chem. Corp. under the name of "Tetronic."

(c) 

wherein $n$ varies preferably from 1 to 30, $a$ from 5 to 300 and $b$ from 0 to 50.

A wide range of products of this kind is marketed by Rohm & Haas under the name of "Triton;" by British Drug House under the name of "Nonidet:" by Union Carbide Corp. under the name of "Tergitol;" and by Geronazzo of Bollate (Milan) under the name of "Soprofor."

(d) 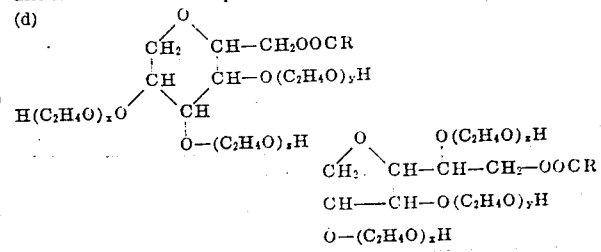

wherein "R" represents the group $C_nH_{2n+1}$ or $C_nH_{2n-1}$; in which $n$ varies preferably from 4 to 30 and $x$, $y$ and $z$ vary preferably from 0 to 100. Some of the products of this type are marketed by Atlas Chemical Ind. under the name of "Tween."

e. $C_nH_{2n+1} CH_2O (C_2H_4O)_a(C_3H_6O)_bH$ where $n$ varies preferably from 4 to 30, $a$ varies from 5 to 300 and $b$ from 0 to 50.

Some products of this type are marketed by Wyandotte Chem. Corp. under the name of "Plurafac," and by Atlas Chemical Ind. under the name of "G. 3910" and "Brij 58."

f. $RCO-(OC_2H_4)_a (OC_3H_6) OX$, wherein "R" represents the group $C_nH_{2n+1}$ or $C_nH_{2n-1}$, in which $n$ varies preferably from 4 to 30; $a$ varies preferably from 5 to 300 and $b$ from 0 to 50; X may be hydrogen or alkyl. Some of the products of this type are marketed by British Drug House under the name of "Nonex," by Atlas under the name of "Myrj 53."

The temperature at which the process of this invention is carried out is around room temperature; it is, however, possible, in some cases, to operate at temperatures higher or lower than this temperature.

In order to further illustrate the present invention and the advantages thereof, the following specific examples are given, it being understood that the same are merely intended to be illustrative and not limitative.

EXAMPLE 1

Into a glass vessel of 250 cc holding capacity, fitted with a discharge device on its bottom and having a diameter of 6.6 cm. there were introduced 200 g. of polytetrafluoroethylene emulsion having a content in solid polymer of 32 percent by weight.

Over the emulsion there was placed a layer of 19 g. of methoxypolyethylenglycol laurate, a liquid product marketed by British Drug House under the commercial name of "Nonex 501." The quantity of water absorbing substance with respect to the emulsified polytetrafluoroethylene amounted to about 30 percent by weight.

After 3 hours the emulsion was discharged from the bottom of the reaction vessel and a polytetrafluoroethylene emulsion concentrated to 70 percent by weight was obtained which was free from hydrophilic material.

The residual aqueous layer displayed a concentration in water absorbing substance of 14 percent by weight. This residual water absorbing substance can be quantitatively recovered by distillation of the water. By operating as in this example 1, also examples 2 to 19 have been carried out by using various liquid water absorbing substance. Table 1 records the relative data.

TABLE 1

| Example number | Water absorbing substance (trade name) | Percent by weight of water absorbing substance on the PTFE emulsion | Concentration of— | | Time (hours) |
|---|---|---|---|---|---|
| | | | Starting emulsion, percent by weight | Obtained emulsion, percent by weight | |
| 2 | Pluronic L44 | 15 | 32 | 45 | 4 |
| 3 | do | 30 | 32 | 60 | 3 |
| 4 | Pluronic L64 | 15 | 32 | 45 | 4 |
| 5 | do | 30 | 32 | 60 | 3 |
| 6 | Plurafac RA 10 | 30 | 32 | 45 | 3 |
| 7 | Tetronic 304 | 30 | 32 | 45 | 3 |
| 8 | Nonex 501 | 15 | 32 | 48 | 5 |
| 9 | Nonidet P 40 | 30 | 32 | 70 | 3 |
| 10 | Glicerina | 30 | 35 | 50 | 3 |
| 11 | Carbowax 400 | 30 | 32 | 45 | 3 |
| 12 | Triton X 100 | 30 | 32 | 65 | 3 |
| 13 | Triton N 100 | 30 | 32 | 65 | 3 |
| 14 | Triton N 101 | 15 | 32 | 46 | 5 |
| 15 | Triton CF 10 | 15 | 32 | 40 | 5 |
| 16 | Tween 80 | 15 | 30 | 46 | 4 |
| 17 | Tween 70 | 30 | 31 | 60 | 4 |
| 18 | Soprofor MAL | 15 | 31 | 45.5 | 3 |
| 19 | do | 30 | 31 | 70 | 3 |

EXAMPLE 20

Into a glass vessel of 250 cc holding capacity, provided with a discharge on its bottom having a 6.6 cm. diameter, there were introduced 200 g. of polytetrafluoroethylene emulsion having a content in solid polymer of 30 percent by weight. Over the emulsion where was placed a layer of 9.5 g. of melted Soprofor Disty, a solid product with a melting point of about 45°C, marketed by Geronazzo of Bollate (Milan). The quantity of water absorbing substance with respect to the emulsified polytetrafluoroethylene turned out to be about 15 percent by weight.

After 3 hours the emulsion was discharged from the bottom of the reaction vessel and a polytetrafluoroethylene emulsion was obtained having a concentration of 46.5 percent and which was free of hydrophilic material.

The water absorbing substance was recovered quantitatively from the aqueous residue by distillation.

Operating as in example 20, examples 21 to 27 were carried out using solid water absorbing products. The relative data are recorded in table 2.

TABLE 2

| Example number | Water absorbing substance (trade name) | Percent by weight of water absorbing substance on the PTFE emulsion | Concentration of— | | Time (hours) |
|---|---|---|---|---|---|
| | | | Starting emulsion, percent by weight | Obtained emulsion, percent by weight | |
| 21 | Soprofor Disty | 30 | 31 | 57 | 4 |
| 22 | Soprofor 797/100 | 15 | 31 | 50.5 | 3 |
| 23 | do | 30 | 31 | 72 | 4 |
| 24 | Atlas G-3910 | 30 | 31 | 58 | 4 |
| 25 | Myrj 53 | 30 | 31 | 58 | 4 |
| 26 | Carbowax 1500 | 30 | 31 | 45 | 3 |
| 27 | Pluronic F68 | 15 | 32 | 40 | 5 |

EXAMPLE 28

Into a glass vessel of 250 cc. holding capacity, provided on its bottom with a discharge having a diameter of 6.6 cm., there were introduced 200 g. of polytetrafluoroethylene emulsion at 31 percent by weight. At the same time 9.5 g. of Soprofor 797/100 were dissolved separately in 4 g. of distilled water.

The creamy liquid thereby obtained was placed as a layer on the polytetrafluoroethylene emulsion and, after 3 hours, the emulsion was discharged through the bottom of the vessel, thereby there was obtained an emulsion concentrated to 58 percent by weight. The water absorbing substance was quantitatively recovered from the residual aqueous layer by distillation of the water.

EXAMPLE 29

Following the same procedures as that followed in example 28 and by using the same quantities, except that instead of Soprofor 797/100 the Atlas G-3910 compound was used, after 3 hours an emulsion of polytetrafluoroethylene was obtained which exhibited a concentration of 52 percent by weight.

EXAMPLE 30

This run was carried out as follows. A cylinder-shaped glass vessel having a diameter of 9.6 cm. was fed with 200 g. of a polytetrafluoroethylene aqueous emulsion having a solid content of 34 percent by weight. The vessel was arranged in a thermostatic bath at 30°C. 5 percent by weight (referred to polytetrafluoroethylene) of Triton-X-100 were added to the emulsion and dissolved by stirring for 30 minutes. Subsequently, 10 percent (referred to polytetrafluoroethylene) of Triton X-100 were added and dissolved under stirring for another 30 minutes. The whole was then left completely at rest for 30 hours. After this period of time, the emulsion showed a solid content of 34 percent.

EXAMPLE 31

This run was carried out as follows: Canadian Pat. No. 536,455 issued to Marks et al. on Jan. 29, 1957.

A cylinder-shaped glass vessel having a diameter of 9.6 cm. was fed with 200 g. of a polytetrafluoroethylene aqueous emulsion having a solid content of 34 percent. The vessel was arranged in a thermostatic bath at 23°C. 9 percent (referred to polytetrafluoroethylene) of Triton X-100 were added and dissolved by stirring for about 25 minutes. The whole was then left completely at rest for 30 hours. After this period of time, the emulsion showed a solid content of 34 percent.

EXAMPLE 32

A cylinder-shaped glass vessel having a diameter of 9.6 cm. was fed with 200 g. of a polytetrafluoroethylene aqueous emulsion having a solid content of 34 percent. 20.4 g. of Triton X-100 (corresponding to 30 percent with respect to polytetrafluoroethylene) were then accurately stratified onto said emulsion. The vessel was arranged in a thermostatic bath at 30°C where it was kept for 3 hours. After this period of time, the lower layer consisting of the emulsion is recovered. The latter had a 60 percent concentration and contains 5 percent of Triton X-100 (with respect to polytetrafluoroethylene).

This example demonstrates that by working according to our process we obtain a concentration of the emulsion within 3 hours: on the contrary, by working as described in examples 30 and 31 we can not obtain any concentration after 30 hours.

As many apparently widely different embodiments of the present invention can be made without departing from the spirit and scope thereof, it is to be understood that the same is not intended to be limited to the specific embodiments thereof, except as defined in the appended claims.

What is claimed is:

1. A process for the concentration of aqueous polytetrafluoroethylene emulsions having a solids content between 5 and 50 percent by weight, consisting of forming, at about room temperature, atop said aqueous polytetrafluoroethylene emulsion to be concentrated, a liquid layer, of a product having the following structural formulas:

a. $H(OC_2H_4)_a(OC_3H_6)_b(OC_2H_4)_cOH$
   wherein $b$ varies between 10 and 100 and further wherein the sum of $a$ and $c$ varies between 10 and 400;

b. $[H(OC_2H_4)_a(OC_3H_6)_b]_2=N-CH_2-CH_2-N==[(C_3H_6O)_b(C_2H_4O)_a]_2$
   wherein $a$ varies between 1 and 100 and further wherein $b$ varies between 1 and 25;

c. 
   wherein $n$ varies between 1 and 30 and further wherein $a$ varies between 5 and 300 and $b$ between 0 and 50;

d. 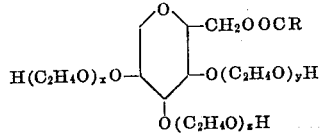
   and
   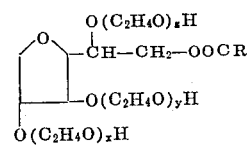
   wherein R is selected from the group consisting of $C_nH_{2n+1}$ and $C_nH_{2n-1}$, with $n$ varying from 4 to 30, and $x$, $y$ and $z$ each varies between 0 and 100;

e. $RCO(OC_2H_4)_a(OC_3H_6)_bOX$
   wherein R is selected from the group consisting of $C_nH_{2n+1}$ and $C_nH_{2n-1}$ with $n$ varying from 4 to 30, and $a$ varies between 5 and 300, $b$ varies between 0 and 50 and X represents a member selected from the group consisting of hydrogen and alkyl;

f. $C_nH_{2n+1}CH_2O(C_2H_4O)_a(C_3H_6O)_bH$
   wherein $n$ varies between 4 and 30, $a$ varies between 5 and 300 and $b$ varies between 0 and 50, the liquid layers having under the working conditions of this process a density lower than that of the emulsion to be concentrated and higher than 1 and a viscosity higher than 200 cps, and then maintaining the obtained two layers in contact with each other, allowing the diffusion of water to take place from the underlying layer through the separation surface and to proceed to a desired degree within a period of up to about 5 hours, thus concentrating the underlying layer, separating the said layers, and then recovering the aqueous polytetrafluoroethylene emulsion thus concentrated having a solids content of from 40 to 72 percent by weight.

* * * * *